US012128671B2

(12) United States Patent
Kawajiri

(10) Patent No.: US 12,128,671 B2
(45) Date of Patent: Oct. 29, 2024

(54) PRINTING APPARATUS AND CONTROL METHOD FOR PRINTING APPARATUS

(71) Applicant: SEIKO EPSON CORPORATION, Tokyo (JP)

(72) Inventor: Masahiro Kawajiri, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 17/933,662

(22) Filed: Sep. 20, 2022

(65) Prior Publication Data

US 2023/0087880 A1 Mar. 23, 2023

(30) Foreign Application Priority Data

Sep. 22, 2021 (JP) ................................ 2021-153938

(51) Int. Cl.

*B41J 11/00* (2006.01)
*B41J 15/04* (2006.01)
*B65H 26/06* (2006.01)

(52) U.S. Cl.

CPC ........ *B41J 11/0045* (2013.01); *B41J 11/0075* (2013.01); *B41J 11/0095* (2013.01); *B41J 15/042* (2013.01); *B65H 26/063* (2013.01); *B65H 2301/41524* (2013.01); *B65H 2403/42* (2013.01); *B65H 2801/12* (2013.01)

(58) Field of Classification Search

CPC . B41J 11/0045; B41J 11/0075; B41J 11/0095; B41J 15/042; B65H 26/063; B65H 2301/41524; B65H 2403/42; B65H 2801/12

See application file for complete search history.

(56) References Cited

U.S. PATENT DOCUMENTS

| | | | | |
|---|---|---|---|---|
| 7,922,409 B2 | 4/2011 | Murahashi | | |
| 2007/0147936 A1* | 6/2007 | Ando | B41J 15/042 | 400/579 |
| 2016/0009108 A1* | 1/2016 | Nakayama | B41J 11/0095 | 347/16 |
| 2018/0281470 A1* | 10/2018 | Kawajiri | B65H 20/02 | |
| 2019/0291483 A1* | 9/2019 | Kawajiri | B41J 15/048 | |

FOREIGN PATENT DOCUMENTS

| | | | |
|---|---|---|---|
| JP | 62-74864 | 4/1987 | |
| JP | H0834554 * | 2/1996 | B41J 29/48 |
| JP | 2002-226100 | 8/2002 | |
| JP | 2007-276173 A | 10/2007 | |

* cited by examiner

*Primary Examiner* — Henok D Legesse

(74) *Attorney, Agent, or Firm* — WORKMAN NYDEGGER

(57) ABSTRACT

A printing apparatus 10 includes support member 12 that supports a core body Ra of a roll medium R, a transport mechanism 17 that transports the print medium S drawn out from the roll medium R, a first accommodation sidewall 27 and a second accommodation sidewall 28 arranged in a width direction, a print head 22, and a trailing edge detection section 60 that detects that all of the print medium S that is drawable out from the roll medium R has been drawn out by the transport mechanism 17, wherein the first accommodation sidewall 27 has groove 50, and the roll medium R is accommodated in an accommodation section 11 by engaging the support member 12 with the groove 50 and the trailing edge detection section 60 detects that the support member 12 is separated from an engagement surface 52 of the groove 50.

8 Claims, 11 Drawing Sheets

PRINTING APPARATUS AND CONTROL METHOD FOR PRINTING APPARATUS

The present application is based on, and claims priority from JP Application Serial Number 2021-153938, filed Sep. 22, 2021, the disclosure of which is hereby incorporated by reference herein in its entirety.

BACKGROUND

1. Technical Field

The present disclosure relates to a printing apparatus and a method of controlling the printing apparatus.

2. Related Art

A printer is described in JP-A-2007-276173. The printer includes a transport mechanism that transports a long print medium along a transport path, a print head that prints an image on the print medium, and a carriage that mounts the print head and moves in a direction that intersects the transport path together with the print head. The printer includes a paper detection section that detects a trailing edge of the print medium, and a drive control section that controls driving of the transport mechanism and the carriage. The paper detector in the JP-A-2007-276173 is provided on a transport path, and detects a leading edge or a trailing edge of the roll paper by an optical sensor or the like. In JP-A-2007-276173, when the trailing edge of the roll paper is detected, an LED lamp is turned on to notify the user that the roll paper has run out.

In a roll medium formed by winding the print medium around a core body in a roll shape, a trailing edge of the print medium is fixed to the core body in some cases. That is, in a case where the trailing edge of the print medium is firmly fixed to the core body with an adhesive or the like, when the remaining amount of the print medium is small, even if tension in a direction in which the print medium is peeled off from the core body is applied to the print medium by the transport mechanism, a state in which the trailing edge of the print medium is not separated from the core body is maintained. For this reason, even attempt is made to detect the trailing edge of the print medium by the paper detector as in the technology described in JP-A-2007-276173, the trailing edge of the print medium is not transported along the transport path, and therefore the trailing edge of the print medium cannot be detected by the paper detector. That is, in the technology described in JP-A-2007-276173, there is a problem with respect to the roll medium in which the trailing edge of the print medium is not peeled off from the core body, in that it is not possible to detect that all of the print medium that is drawable out from the roll medium has been drawn out by the transport mechanism.

SUMMARY

In one aspect of a printing apparatus according to the present disclosure the printing apparatus includes a support member configured to support a core body of a roll medium formed by winding a print medium around the core body in a roll shape, a transport mechanism configured to transport the elongated print medium drawn out from the roll medium along a transport path, a first accommodation sidewall and a second accommodation sidewall that constitute a part of an accommodation section configured to accommodate the roll medium and that are disposed to face each other in a width direction, which intersects a transport direction of the print medium, a print head configured to print an image on the print medium, and a trailing edge detection section configured to detect that all of the print medium that is drawable out from the roll medium has been drawn out by the transport mechanism, wherein the first accommodation sidewall has a groove, and the roll medium is accommodated in the accommodation section by the support member engaging with the groove and the trailing edge detection section detects that the support member separated from an engagement surface of the groove.

An aspect of a method for controlling a printing apparatus according to the present disclosure the method for controlling the printing apparatus includes a support member configured to support a core body of a roll medium formed by winding a print medium around the core body in a roll shape, a transport mechanism configured to transport the elongated print medium drawn out from the roll medium along a transport path, a first accommodation sidewall and a second accommodation sidewall that constitute a part of an accommodation section that accommodates the roll medium and that are disposed to face each other in a width direction, which intersects a transport direction of the print medium, and a print head configured to print an image on the print medium, wherein the first accommodation sidewall has a groove, and the roll medium is accommodated in the accommodation section by the support member engaging with the groove, the method comprising detecting that the print medium that is drawable from the roll medium is completely drawn out by the transport mechanism, based on separation of the support member from the engagement surface of the groove.

DESCRIPTION OF EMBODIMENTS

Hereinafter, preferred embodiments of the present disclosure will be described in detail with reference to the drawings. Note that the embodiments described below do not limit the contents of the present disclosure described in the claims. In addition, not all of the configurations described below are essential constituent elements of the disclosure.

1. Overview of Printing Apparatus

Figure 1:
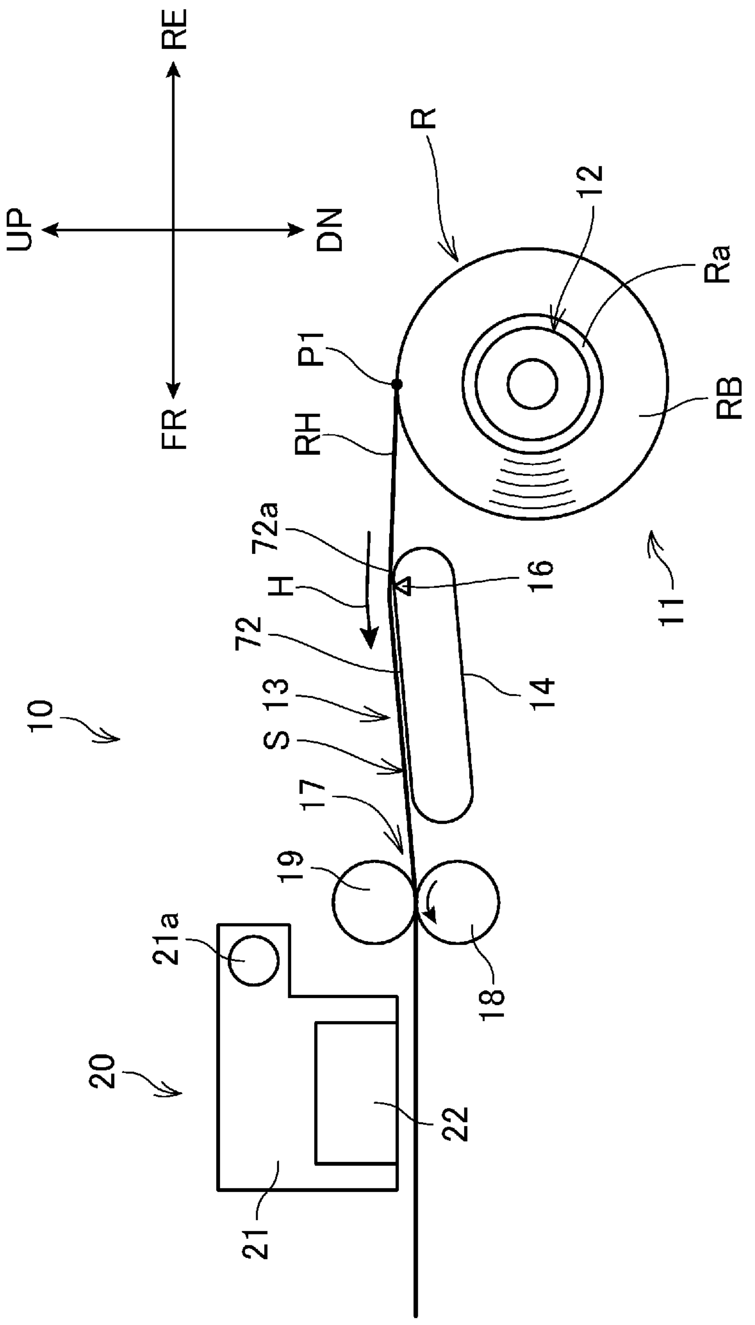
FIG. 1 is a diagram showing an outline of a printing apparatus according to an embodiment.

FIG. 1 is a diagram showing an outline of a printing apparatus 10 according to the present embodiment.

In the description with reference to FIG. 1, as indicated by an arrow, a direction toward the left in the drawing is defined as a front direction, and is indicated by a symbol FR in the drawing. Similarly, the direction toward the right in the drawing is referred to as rearward, and is indicated by a symbol RE in the drawing. Further, an upward direction in the drawing is referred to as an upward direction and is indicated by a symbol UP in the drawing. A downward direction in the drawing is referred to as a downward direction, and is denoted by a symbol DN in the drawing. The same applies to each drawing described below.

The printing apparatus 10 is a serial type ink jet printer. The printing apparatus 10 accommodates a roll paper R formed by winding an elongated print medium S around a core body RA in a roll shape, and feeds out and transports the roll paper R in a transport direction H. The printing apparatus 10 prints an image on the transported roll paper R, that is, the print medium S, by ejecting ink from an inkjet head 22 configured as a serial head.

The roll paper R corresponds to an example of a roll medium. The inkjet head 22 corresponds to an example of a print head.

The printing apparatus 10 includes an accommodation section 11 that accommodates the roll paper R. In the following description, a roll shaped portion of the roll paper R accommodated in the accommodation section 11 may sometimes be referred to as a roll body RB. In addition, a portion of the roll paper R that is fed and transported from the roll body RB accommodated in the accommodation section 11 may sometimes be referred to as transport roll paper RH. In the exemplary embodiment, since an image is printed on the transport roll paper RH, the print medium S may sometimes be referred to as the transport roll paper RH. A position at which the transport roll paper RH is fed from the roll body RB is expressed as a feeding position P1.

A roll feeding shaft 12 for supporting the core body Ra at the center part of the roll body RB is arranged in the accommodation section 11. In the present embodiment, the core body Ra has a hollow cylindrical shape. The roll feeding shaft 12 is fitted to the core body Ra. The roll feeding shaft 12 supports the roll body RB via the core body Ra. The roll feeding shaft 12 is connected to a feed drive mechanism 42 shown in FIG. 3 to be described later, and rotates in accordance with drive of a feed motor 43 of the feed drive mechanism 42. The roll body RB rotates in conjunction with the rotation of the roll feeding shaft 12, and the transport roll paper RH is fed out from the roll body RB.

A transport path 13 through which the transport roll paper RH is transported is formed in the printing apparatus 10. The transport roll paper RH fed from the roll body RB is transported in the transport direction H along the transport path 13.

The transport path 13 is provided with a guide member 14. The guide member 14 contacts the back surface of the transport roll paper RH and bends the advancing direction of the transport roll paper RH, which is being fed upward, to direct the advancing direction forward. The guide member 14 contacts the transport roll paper RH and bends the advancing direction of the transport roll paper RH, thereby applying tension to the transport roll paper RH and suppressing generation of slack in the transport roll paper RH.

A paper detection sensor 16 that detects the presence or absence of the transport roll paper RH is provided in the transport path 13. The paper detection sensor 16 is provided at an upstream portion of the guide member 14 in the transport direction H. The paper detection sensor 16 is an optical sensor. The paper detection sensor 16 outputs different detection values to a control section 100 shown in FIG. 7, depending on whether or not the transport roll paper RH is located at the detection position of the paper detection sensor 16. The control section 100 is configured to detect that a trailing edge of the transport roll paper RH has reached the detection position of the paper detection sensor 16, based on the detection value input from the paper detection sensor 16. The paper detection sensor 16 may be a mechanical switch.

The paper detection sensor 16 corresponds to an example of a medium detection section.

A transport mechanism 17 is provided downstream of the guide member 14 in the transport direction H. The transport mechanism 17 transports the elongated print medium S drawn out from the roll paper R, that is, the transport roll paper RH, along the transport path 13.

The transport mechanism 17 has a drive roller 18. A driven roller 19 is provided at a position opposed to the drive roller 18. In the present embodiment, the drive roller 18 is disposed below the print medium S and the driven roller 19 is disposed above the print medium S, with the print medium S interposed therebetween. The transport roll paper RH is held between the drive roller 18 and the driven roller 19, and is transported in the transport direction H in accordance with the rotation of the drive roller 18. The drive roller 18 is connected to a motor shaft of a transport motor 221 illustrated in FIG. 6 described below, via a power transmission mechanism (not illustrated). The drive roller 18 rotates in accordance with drive of the transport motor 221.

A print unit 20 is provided downstream of the drive roller 18 in the transport direction H.

The print unit 20 includes a carriage 21 and the inkjet head 22 mounted on the carriage 21.

The carriage 21 is supported by a carriage shaft 21*a* extending in a scanning direction, which intersects the transport direction H, and scans the inkjet head 22 in the scanning direction along the carriage shaft 21*a*.

The inkjet head 22 includes nozzle rows corresponding to a plurality of colors. The plurality of nozzle rows are, for example, nozzle rows of four colors of cyan, yellow, magenta, and black. The inkjet head 22 prints an image by ejecting ink supplied from an ink cartridge (not shown) from nozzles provided in nozzle rows, to form dots on the transport roll paper RH.

2. Configuration of Main Part of Printing Apparatus

Figure 2:
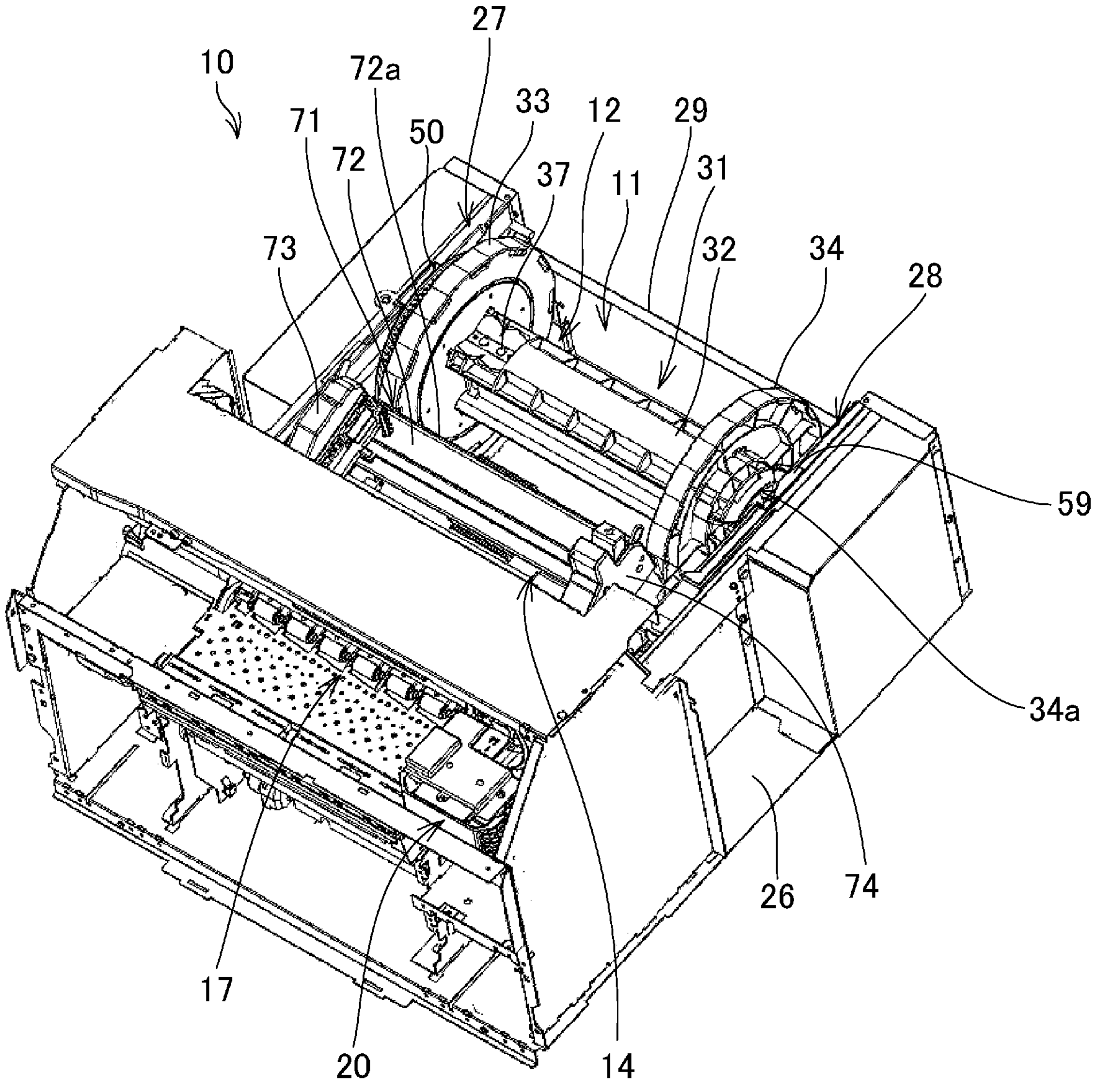
FIG. 2 is a perspective view showing an appearance of the printing apparatus according to the embodiment.

FIG. 2 is a perspective view showing an appearance of the printing apparatus 10 according to the present embodiment.

The printing apparatus 10 has a bottom frame 26 having a flat plate shape. The bottom frame 26 is formed with a left accommodation sidewall 27 and a right accommodation sidewall 28 that are disposed to face each other in a left-right direction, which intersects the transport direction H of the transport roll paper RH. The left-right direction corresponds to the width direction of the transport roll paper RH. A rear frame 29 is supported at rear portions of the left accommodation sidewall 27 and the right accommodation sidewall 28 so as to straddle the left accommodation sidewall 27 and the right accommodation sidewall 28. The accommodation section 11 of the present embodiment is constituted by an enclosing shape configured by the bottom frame 26, the left accommodation sidewall 27, the right accommodation sidewall 28, and the rear frame 29. The left accommodation sidewall 27 and the right accommodation sidewall 28 constitute a part of the accommodation section 11 that accommodates the roll paper R.

The left accommodation sidewall 27 corresponds to an example of a first accommodation sidewall. The right accommodation sidewall 28 corresponds to an example of a second accommodation sidewall. The left-right direction corresponds to an example of the width direction.

3. Configuration of Feeding Mechanism

As shown in FIG. 2, the roll feeding shaft 12 that supports the core body Ra of the roll paper R is disposed in the accommodation section 11. The roll feeding shaft 12 has a roll shaft section 31. The roll shaft section 31 has an insertion member 32 extending in the width direction and inserted into the core body Ra. The insertion member 32 is formed in a cylindrical shape extending in the width direction. A left flange member 33 having a disc shape is fixed to a left end of the insertion member 32, which corresponds to an example of a first end in the width direction. The left flange member 33 is configured to support the roll paper R from the left. A right flange member 34 is supported at a right end of the insertion member 32, which corresponds to an example of a second end in the width direction. An insertion hole 34*a* into which the insertion member 32 is detachably inserted is formed in the right flange member 34. The distance between the right flange member 34 and the left flange member 33 in the width direction is adjustable by inserting the insertion member 32 into the insertion hole 34*a*. The right flange member 34 is configured to support the roll paper R from the right.

Figure 3:
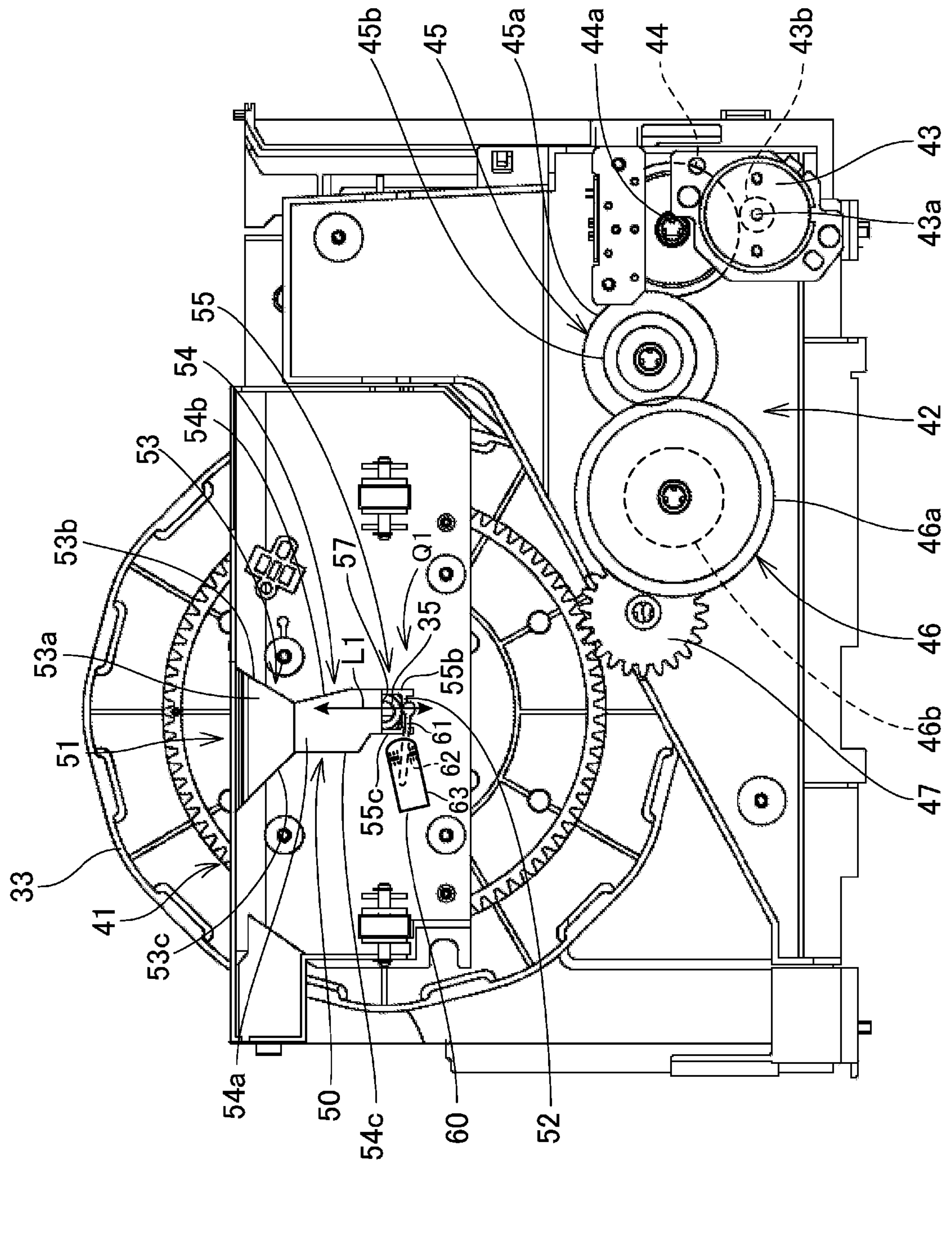
FIG. 3 is a view showing a state in which a drive gear and a driven gear of a feed drive mechanism are meshed with each other.
Figure 4:
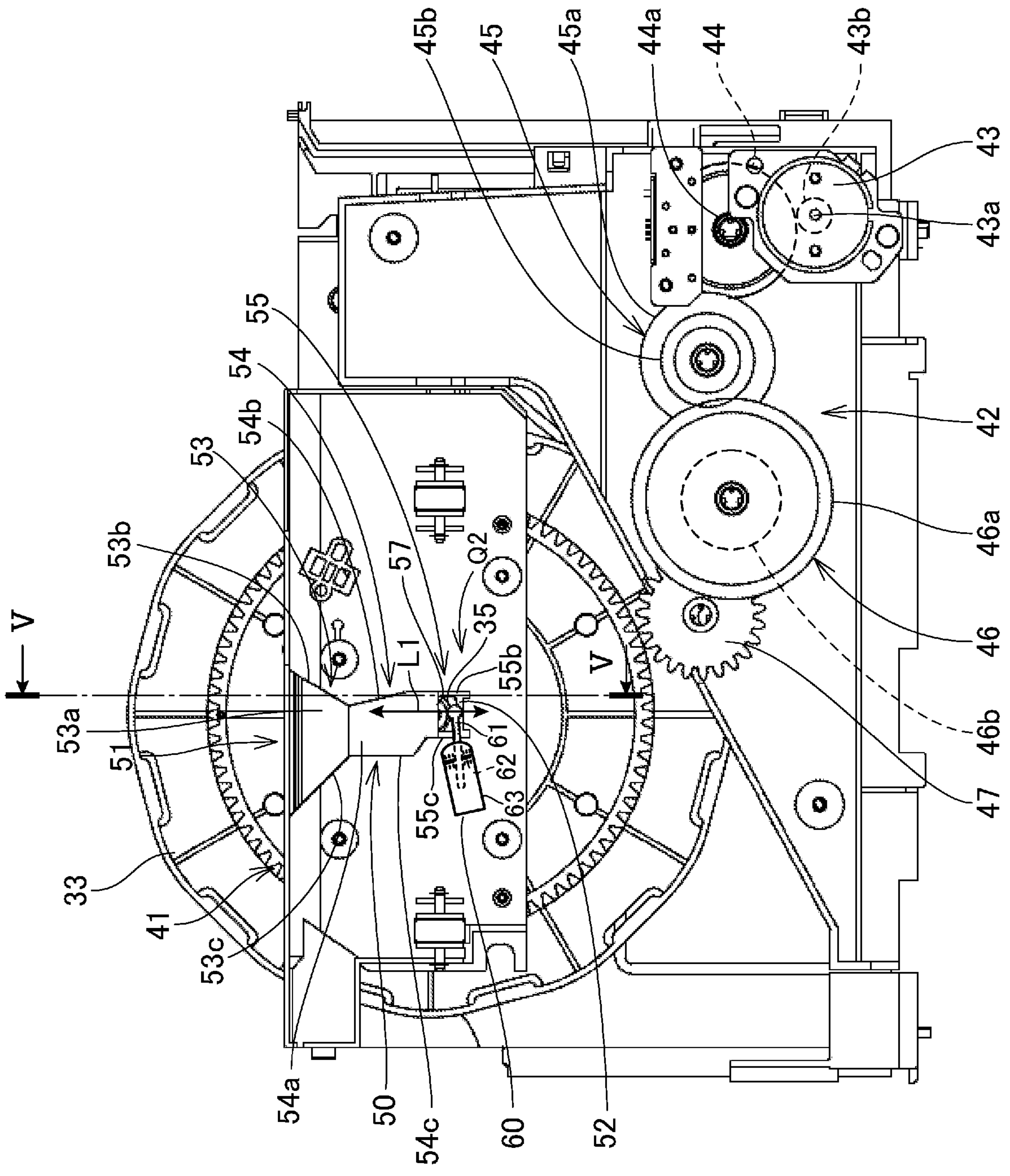
FIG. 4 is a view showing a state in which meshing between a drive gear and a driven gear of a feeding drive mechanism is released.
Figure 5:
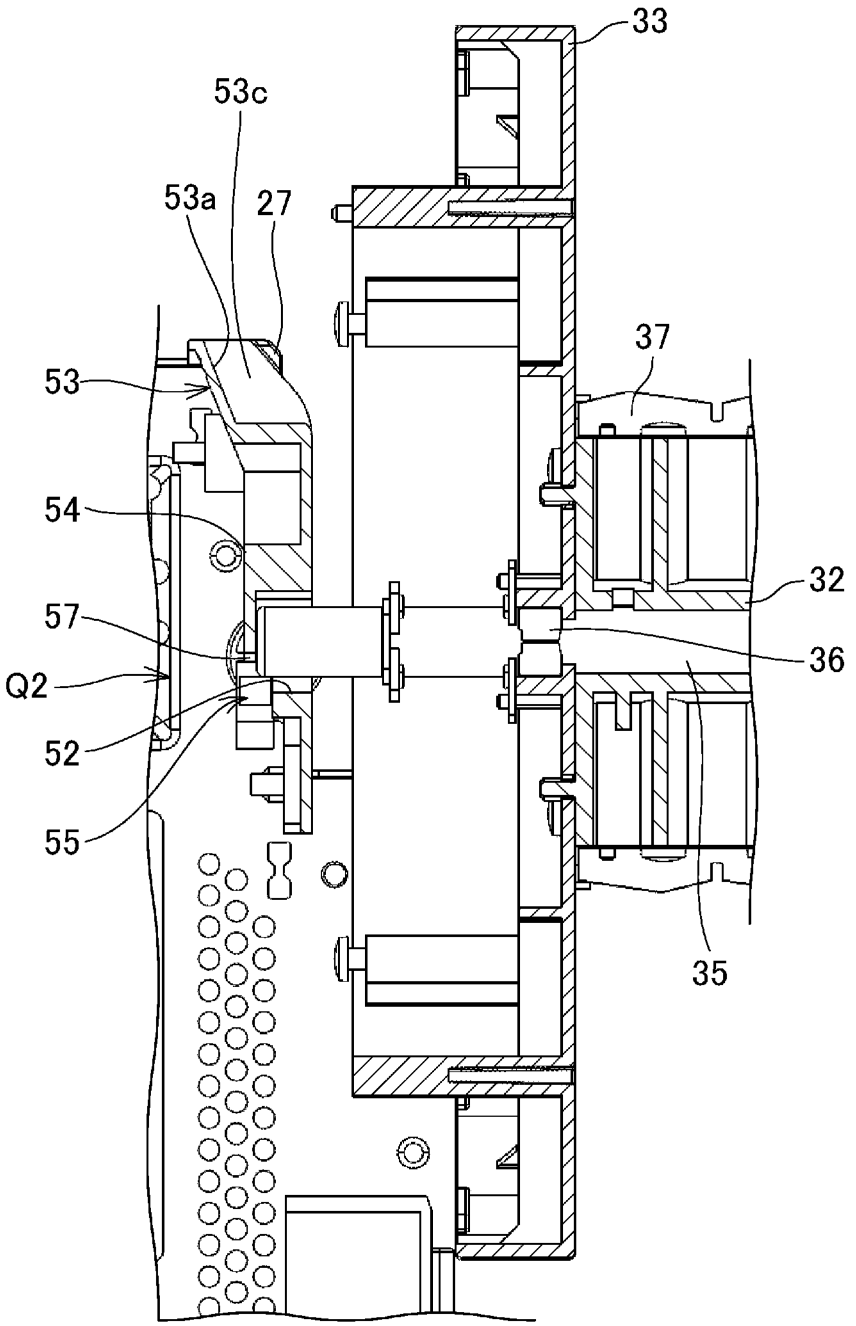
FIG. 5 is a cross sectional view taken along line V-V in FIG. 4.
Figure 6:
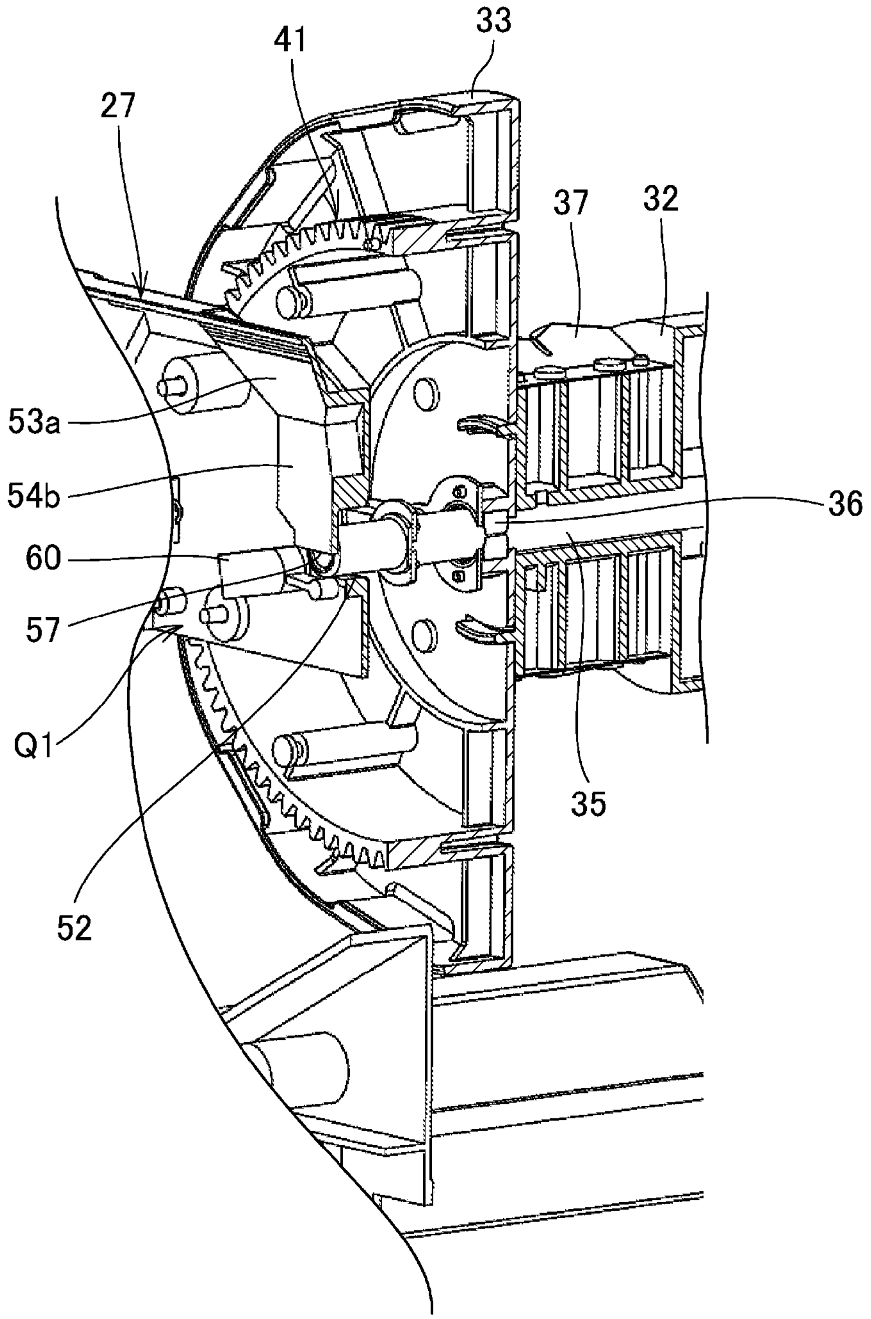
FIG. 6 is a perspective view corresponding to FIG. 5.

FIG. 3 is a view showing a state in which a drive gear 47 and a driven gear 41 of the feed drive mechanism 42 are meshed with each other. FIG. 4 is a view showing a state in which the drive gear 47 and the driven gear 41 of the feeding drive mechanism 42 are unmeshed from each other. FIG. 5 is a cross sectional view taken along line V-V in FIG. 4. FIG. 6 is a perspective view corresponding to a cross sectional portion of FIG. 5.

As shown in FIGS. 5 and 6, a support shaft 35 extending in the width direction is disposed inside the insertion member 32. The support shaft 35 is longer than a right-left width of the accommodation section 11. The support shaft 35 is formed to have a length straddling the left accommodation sidewall 27 and the right accommodation sidewall 28. The insertion member 32, the left flange member 33, and the right flange member 34 are supported on the support shaft 35. In this embodiment, the insertion member 32 is rotatably supported by the support shaft 35 via a bearing 36. Therefore, the left flange member 33, which is fixed to the insertion member 32, and the right flange member 34, which is supported by the insertion member 32, are, together with the insertion member 32, rotatable with respect to the support shaft 35.

A fitting section 37 is formed on the left side of the insertion member 32. When fit into the core body Ra of the roll paper R, the fitting section 37 fits in the inner peripheral section of the core body Ra. That is, when the roll paper R is positioned in the width direction by abutting a side end in the width direction against the left flange member 33, the roll paper R fits on the roll feeding shaft 12.

The roll shaft section 31 corresponds to an example of a shaft member. The left flange member 33 corresponds to an example of a first width support member. The right flange member 34 corresponds to an example of a second width support member.

The left flange member 33 is provided with the driven gear 41. The driven gear 41 is arranged concentrically with the support shaft 35. The driven gear 41 is provided on a left surface corresponding to an outer surface in the width direction of the left flange member 33. The driven gear 41 is integrally formed with the left flange member 33. The driven gear 41 constitutes a part of the left flange member 33.

A driving force is transmitted to the driven gear 41 from the feed drive mechanism 42.

The feed drive mechanism 42 includes the feed motor 43. A motor gear 43*b* is supported on a motor shaft 43*a* of the feed motor 43. An intermediate gear 44 meshes with the motor gear 43*b*. A rotation center 44*a* of the intermediate gear 44 is set above the motor shaft 43*a*. A large diameter gear section 45*a* of a first compound gear 45 meshes with the intermediate gear 44 from the rear side. A large diameter gear section 46*a* of a second compound gear 46 meshes with a small diameter gear section 45*b* of the first compound gear 45 from the rear side. The drive gear 47 meshes with a small diameter gear section 46*b* of the second compound gear 46. When the roll feeding shaft 12 is in contact with a positioning surface 52, the drive gear 47 meshes with the driven gear 41. Meshing corresponds to an example of engagement.

When the motor shaft 43*a* of the feed motor 43 is driven, a driving force is transmitted to the drive gear 47 via the motor gear 43*b*, the intermediate gear 44, the first compound gear 45, and the second compound gear 46. When the driving force is transmitted, the drive gear 47 transmits the driving force to the driven gear 41, and rotates the roll feeding shaft 12.

4. Configuration of Engagement Groove

As shown in FIG. 2, the left accommodation sidewall 27 and the right accommodation sidewall 28 have an engagement groove 50 and an engagement groove 59, respectively. The support shaft 35 of the roll feeding shaft 12 is engaged with these engagement grooves 50, 59 in a straddling manner, whereby the roll paper R is accommodated in the accommodation section 11. Since the engagement groove 59 of the right accommodation sidewall 28 can be configured to have left-right symmetry with the engagement groove 50 on the left side, the engagement groove 50 of the left accommodation sidewall 27 will be described below.

The engagement groove 50 is formed in the left accommodation sidewall 27 so as to be recessed outward in the width direction from the surface on the accommodation section 11 side. As shown in FIGS. 3 and 4, the engagement groove 50 extends in a vertical direction. The engagement groove 50 has an opening section 51 configured to receive the support shaft 35 at an upper end. The positioning surface 52 is formed at a lower end of the engagement groove 50.

In this embodiment, the engagement groove 50 has a receiving section 53 which narrows with upward to downward progression, a guide section 54 extending downward from a lower end of the receiving section 53, and an engagement section 55 provided below the guide section 54.

The engagement groove 50 corresponds to an example of a groove. The positioning surface 52 corresponds to an example of an engagement surface.

The receiving section 53 is formed by a receiving central surface 53*a*, a receiving front surface 53*b* and a receiving rear surface 53*c*. The receiving central surface 53*a* slants toward the accommodation section 11 with progression downward. The receiving front surface 53*b* is connected to a front edge of the receiving central surface 53*a* and slants rearward with progression downward. The receiving rear surface 53c is connected to a rear edge of the receiving central surface 53a and slants forward with progression downward.

The guide section 54 is formed by a guide central surface 54a, a guide front surface 54b and a guide rear surface 54c. The guide central surface 54a has a planar shape extending downward from a lower end of the receiving central surface 53a. The guide front surface 54b is connected to a front edge of the guide central surface 54a and extends downward. The guide rear surface 54c is connected to a rear edge of the guide central surface 54a and extends downward.

The engagement section 55 is formed by an engagement section front surface 55b extending downward from the lower end of the guide front surface 54b, an engagement section rear surface 55c extending downward from the lower end of the guide rear surface 54c, and the positioning surface 52 connecting between the lower end of the engagement section front surface 55b and the lower end of the engagement section rear surface 55c.

A front-rear width of the engagement section front surface 55b and the engagement section rear surface 55c correspond to the outer diameter of the support shaft 35. This makes it difficult for the support shaft 35 to move in a front-rear direction, which corresponds to an example of a groove width direction, in the engagement section 55 of the engagement groove 50.

In this embodiment, the support shaft 35 of the roll feeding shaft 12 contacts the positioning surface 52 by the action of gravity, and the support shaft 35 is positioned.

Of the engagement section front surface 55b and the engagement section rear surface 55c which the support shaft 35 can contact when the support shaft 35 is positioned on the positioning surface 52, the engagement section front surface 55b, which is closer to the guide member 14, constitutes a separation guide surface. The direction in which the engagement section front surface 55b, which corresponds to the separation guide surface, extends corresponds to an extension direction L1 of the engagement groove 50 in the present embodiment.

As shown in FIG. 3, the driven gear 41 and the drive gear 47 mesh with each other by engaging the roll feeding shaft 12 with the engagement grooves 50, 59, that is, by contacting the support shaft 35 against the positioning surface 52. Further, as shown in FIG. 4, state where the support shaft 35 of the roll feeding shaft 12 is separated from the positioning surface 52, the engagement state between the driven gear 41 and the drive gear 47 is unmeshed.

An opening 57 is formed in the engagement section 55 of the engagement groove 50 penetrating through the left accommodation sidewall 27 in the thickness direction. The opening 57 communicates with the inside of the engagement groove 50, and exposes the support shaft 35 to outside in the width direction of the left accommodation sidewall 27. A lower portion of the support shaft 35, which is on the positioning surface 52 side in the extension direction L1, is exposed downward through the opening 57.

5. Configuration of Trailing Edge Detection Section

A shaft separation detection sensor 60 is disposed at a position adjacent to the opening 57. The shaft separation detection sensor 60 detects that all of the transport roll paper RH that is drawable out from the roll paper R has been drawn out by the transport mechanism 17. The shaft separation detection sensor 60 detects that all of the transport roll paper RH that is drawable out from the roll paper R is being drawn out by the transport mechanism 17 by detecting that the support shaft 35 of the roll feeding shaft 12 is separated from the positioning surface 52 of the engagement groove 50.

In the present embodiment, the shaft separation detection sensor 60 includes a lever 61 that contacts the lower portion of the support shaft 35 in a state in which the support shaft 35 is in contact with the positioning surface 52. Further, the shaft separation detection sensor 60 includes a biasing member 62 that biases the lever 61 toward the support shaft 35. The shaft separation detection sensor 60 is configured such that the lever 61 is displaced by the biasing force of the biasing member 62 when the support shaft 35 separates from the positioning surface 52.

The shaft separation detection sensor 60 corresponds to an example of a trailing edge detection section.

Specifically, the shaft separation detection sensor 60 can be configured by a so called detection switch such as a microswitch. In the present embodiment, the shaft separation detection sensor 60 includes a sensor main body section 63. The sensor main body section 63 is disposed on an outer surface in the width direction of the left accommodation sidewall 27. The lever 61 is supported by the sensor main body section 63 of the engagement groove 50. The lever 61 is arranged below the engagement groove 50. The lever 61 enters from the width-direction outer surface of the left accommodation sidewall 27, through the opening 57, into a width-direction inner side of the engagement groove 50. Thus, the lever 61 is supported swingable between a shaft detection position Q1 shown in FIG. 3 at which the lever 61 is in contact with the lower surface of the support shaft 35 engaged with the positioning surface 52 and a separation position Q2 shown in FIG. 4 at which the lever 61 is moved upward from the shaft detection position Q1. The sensor main body section 63 is configured such that the detection value input to the control section 100 switches when the lever 61 moves from the shaft detection position Q1 to the separation position Q2.

The lever 61 is biased toward the separation position Q2 by the biasing member 62. The biasing member 62 is, for example, a spring. The biasing member 62 is supported by the sensor main body section 63. The biasing member 62 is set to an elastic force so as to be easily elastically deformed when the lever 61 is pushed by the support shaft 35 from the separation position Q2 toward the shaft detection position Q1. That is, the biasing force of the biasing member 62 is weaker than the force needed to separate the support shaft 35 of the roll feeding shaft 12 from the positioning surface 52.

In the roll feeding shaft 12, the roll shaft section 31 is rotatable with respect to the support shaft 35. Therefore, as compared with a case where the support shaft 35 rotates integrally with the roll shaft section 31, the lever 61 in contact with the support shaft 35 is less likely to be affected by friction or the like caused by the rotation of the roll feeding shaft 12. Therefore, the position of the support shaft 35 is easily detectable with high accuracy by the shaft separation detection sensor 60 including the contact type lever 61.

6. Configuration of Guide Member

As shown in FIGS. 1 and 2, the guide member 14 that guides the transport roll paper RH is provided between the roll feeding shaft 12 and the drive roller 18 in the transport path 13. The guide member 14 is provided above a front portion of the accommodation section 11 by a support mechanism (not shown). The guide member 14 includes a guide base 71 configured to support the lower surface of the transport roll paper RH drawn out from the accommodation section 11. The guide base 71 includes an upper surface 72 extending in the width direction and inclined downward toward the front side. A rear end 72*a* of the upper surface 72 is provided at one end side in the extension direction L1, that is, higher than, an upper end of the core body Ra of the roll paper R. Therefore, when a remaining amount of the roll paper R is small, the upper surface 72 is positioned above the outer peripheral surface of the roll body RB in the extension direction L1. Therefore, the transport roll paper RH is easily drawn in the extension direction L1 from the feeding position P1.

A fixed guide 73 having a side wall shape and a movable guide 74 that guide the transport roll paper RH are supported on the guide base 71. The fixed guide 73 is fixed to a left side of the upper surface 72. The movable guide 74 is supported slidably in the width direction with respect to the upper surface 72. The movable guide 74 is supported so as to approach to and separate from the fixed guide 73.

The fixed guide 73 and the movable guide 74 guide the position of side edges of the transport roll paper RH by contacting width direction edges of the transport roll paper RH, that is, the side edges of the transport roll paper RH. The transport roll paper RH is transported with the fixed guide 73 side as a position reference.

7. Configuration of Control System of Printing Apparatus

Figure 7:
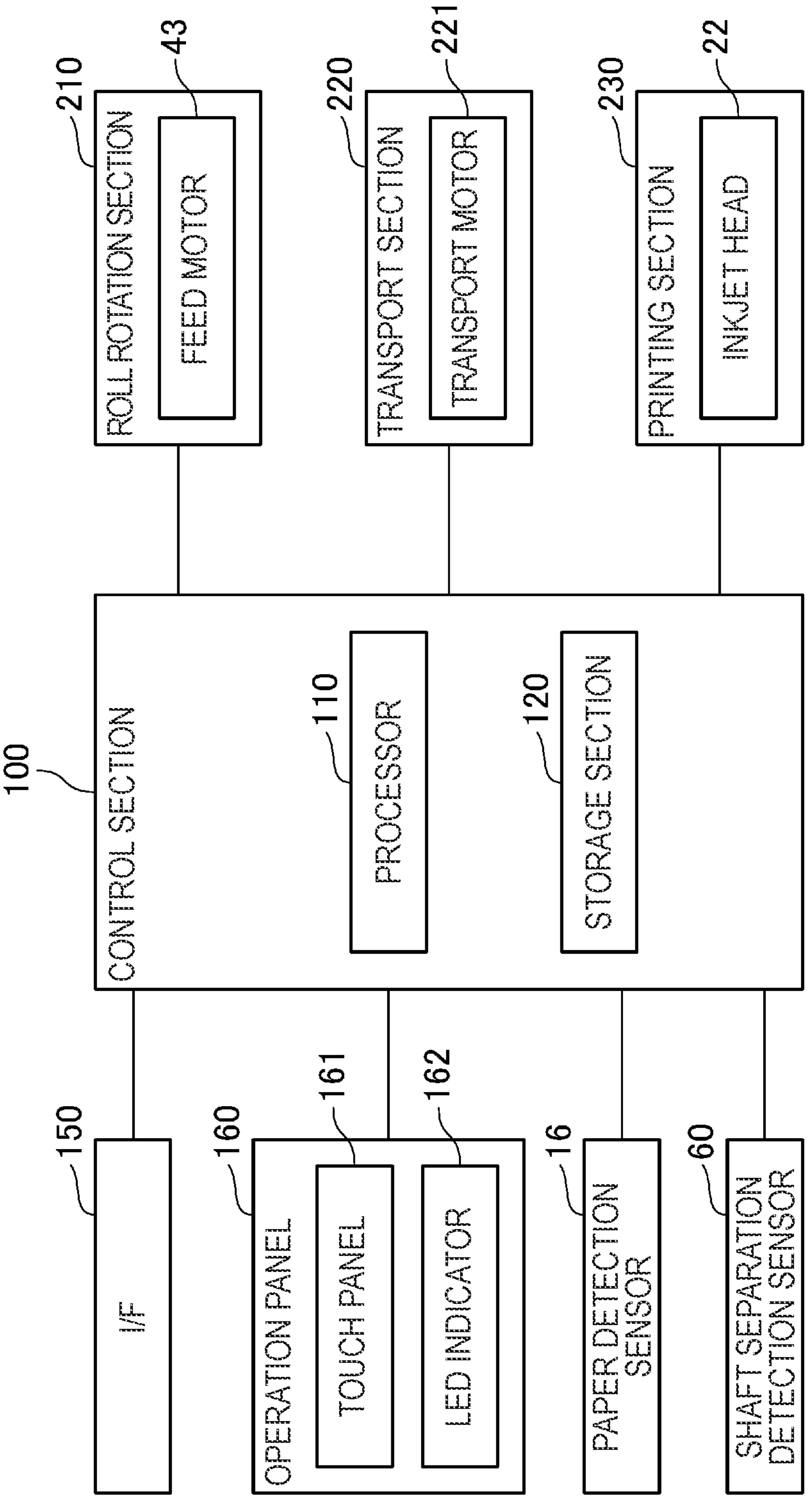
FIG. 7 is a block diagram showing a configuration of a main part of a control system of the printing apparatus.

FIG. 7 is a block diagram showing a main configuration of a control system of the printing apparatus 10.

The printing apparatus 10 includes the control section 100 that controls each section of the printing apparatus 10. The control section 100 includes a processor 110 that executes a control program and a storage section 120. The processor 110 is an arithmetic processing device configured by a CPU, DSP, a microcomputer, or the like. The processor 110 may be configured by a plurality of pieces of hardware or may be configured by a single processor. The processor 110 may be hardware programmed to realize the function of each section described below. That is, the processor 110 may have a configuration in which the control program is installed as a hardware circuit. In this case, for example, the processor 110 is configured by an ASIC or an FPGA.

The processor 110 realizes various functions of the control section 100 by executing the control program.

CPU is an acronym for central processing unit. DSP is an acronym for digital signal processor. ASIC is an acronym for application specific integrated circuit. FPGA is an acronym for field programmable gate array.

The storage section 120 has a storage area for storing the control program executed by the processor 110 and data processed by the processor 110. The storage section 120 stores the control program executed by the processor 110 and setting data including various setting values related to the operation of the printing apparatus 10. The storage section 120 has a non volatile storage area storing the control program and data in a nonvolatile manner. In addition, the storage section 120 may include a volatile storage area and configure a work area that temporarily stores the control program executed by the processor 110 and data to be processed.

An interface 150 is connected to the control section 100. The interface 150 is abbreviated as I/F in FIG. 7. The interface 150 is a USB or a LAN, and is connected in a wired or wireless manner to an apparatus external from the printing apparatus 10. The interface 150 includes, for example, a connector for connecting a cable and an interface circuit for sending an electric signal via the cable. The interface 150 may be a wireless communication module including an antenna and an RF circuit. The apparatus external from the printing apparatus 10 is, for example, a computer or a server device. When receiving image data from the external apparatus via the interface 150, the control section 100 stores the received image data in the storage section 120. When the control section 100 receives data of a print job instructing printing from the external device via the interface 150, the control section 100 stores the received data of the print job in the storage section 120.

USB is an acronym for universal serial bus. LAN is an acronym for local area network.

An operation panel 160 is connected to the control section 100. The operation panel 160 is disposed on an exterior of a main body of the printing apparatus 10, and includes a touch panel 161 as an example of an input section and an LED indicator 162 as an example of an output section. The control section 100 detects an operation on the touch panel 161. In addition, the control section 100 controls lighting and blinking of the LED indicator 162 according to an operation state of the printing apparatus 10. LED is an acronym for light emitting diode.

Detection values from both the paper detection sensor 16 and the shaft separation detection sensor 60 are input to the control section 100.

A roll rotation section 210 is provided with elements related to the rotation of the roll feeding shaft 12. The roll rotation section 210 includes, as elements related to the rotation of the roll feeding shaft 12, the feed drive mechanism 42 and a motor driver that drives the feed motor 43 of the feed drive mechanism 42. By the control of the control section 100, the roll rotation section 210 drives the feed motor 43 to rotate the roll feeding shaft 12 and the core body Ra supported by the roll feeding shaft 12, thereby feeding out the transport roll paper RH from the roll body RB.

A transport section 220 includes elements related to transport of the transport roll paper RH. The transport section 220 includes, as elements related to transport of the transport roll paper RH, the transport motor 221, the power transmission mechanism that transmits power of the transport motor 221 to the drive roller 18, and the motor driver that drives the transport motor 221. By control of the control section 100, the transport section 220 drives the transport motor 221 to rotate the drive roller 18, and transports the transport roll paper RH fed from the roll body RB.

A printing section 230 includes elements related to printing. The printing section 230 includes the inkjet head 22 and the carriage 21 as elements related to printing. By control of the control section 100, the printing section 230 prints an image by using the inkjet head 22 to form dots on the transport roll paper RH transported by the transport section 220.

When the printing apparatus 10 is powered on and a print job is received, the control section 100 according to this embodiment performs printing on the transport roll paper RH based on the print job. When performing printing, the control section 100 controls the transport section 220 and the printing section 230 to perform the following process. The control section 100 controls the printing section 230 to perform pass printing with the inkjet head 22, which is a serial head. At this time, the control section 100 controls the transport section 220 to transport the transport roll paper RH in the transport direction H by a predetermined amount at a timing corresponding to the timing of pass printing by the inkjet head 22. Images are sequentially printed on the transport roll paper RH, by alternately repeating the pass printing and the transport of the transport roll paper RH.

When performing printing, the control section 100 determines whether or not all of the print medium S that is drawable out from the core body Ra of the roll paper R has been drawn out by the transport mechanism 17. The fact that all of the print medium S that is drawable out from the core body Ra of the roll paper R has been drawn out by the transport mechanism 17 means there is "no paper." "No paper" is a state in which printing cannot be performed due to insufficient remaining amount of the print medium S. "No paper" may include a state in which, when a normal print operation is performed, printing cannot be performed in a short time due to a shortage of the remaining amount of the print medium.

Figure 8:
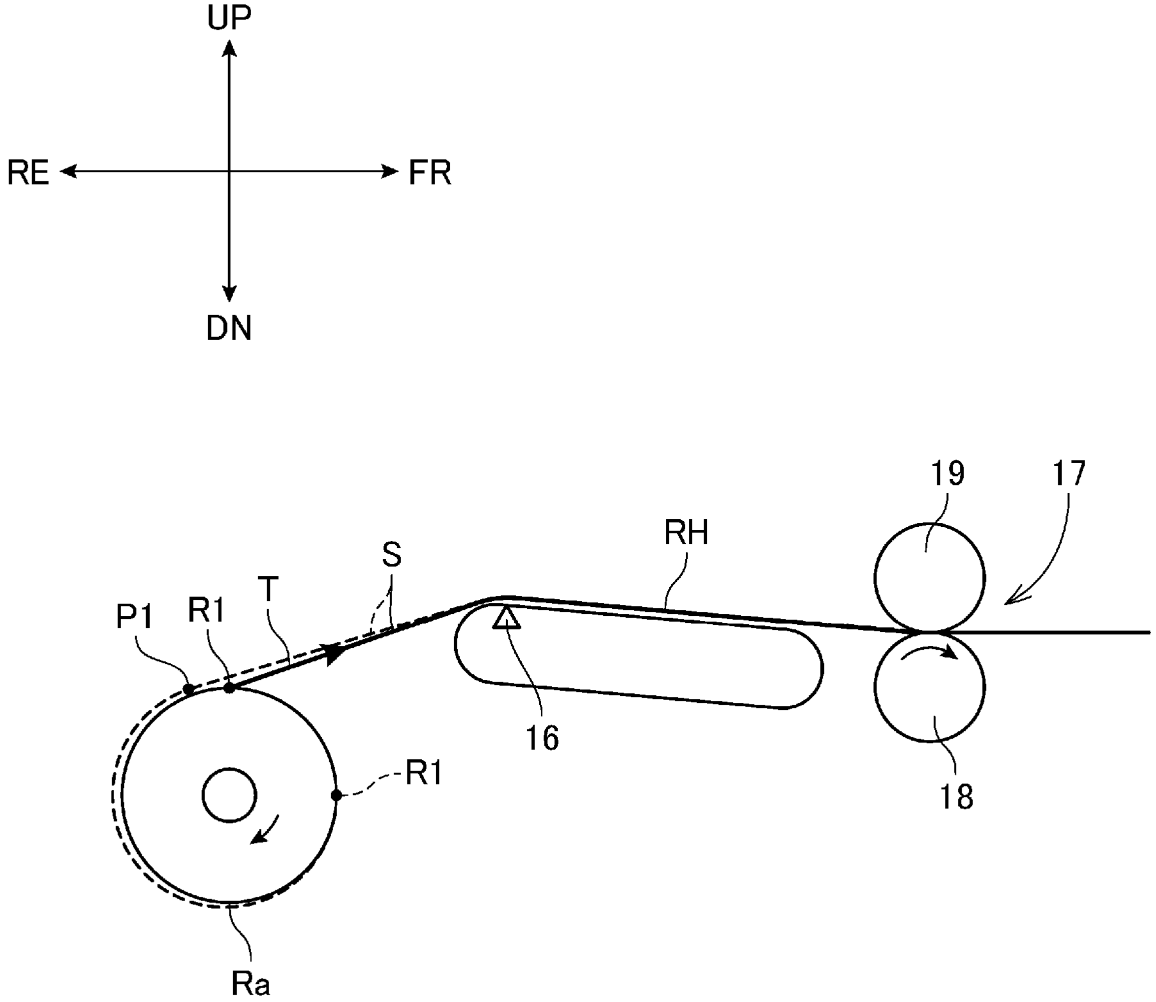
FIG. 8 is a diagram showing a case where the remaining amount of the roll paper has become small and a case where tension acts on the trailing edge of the roll paper.
Figure 9:
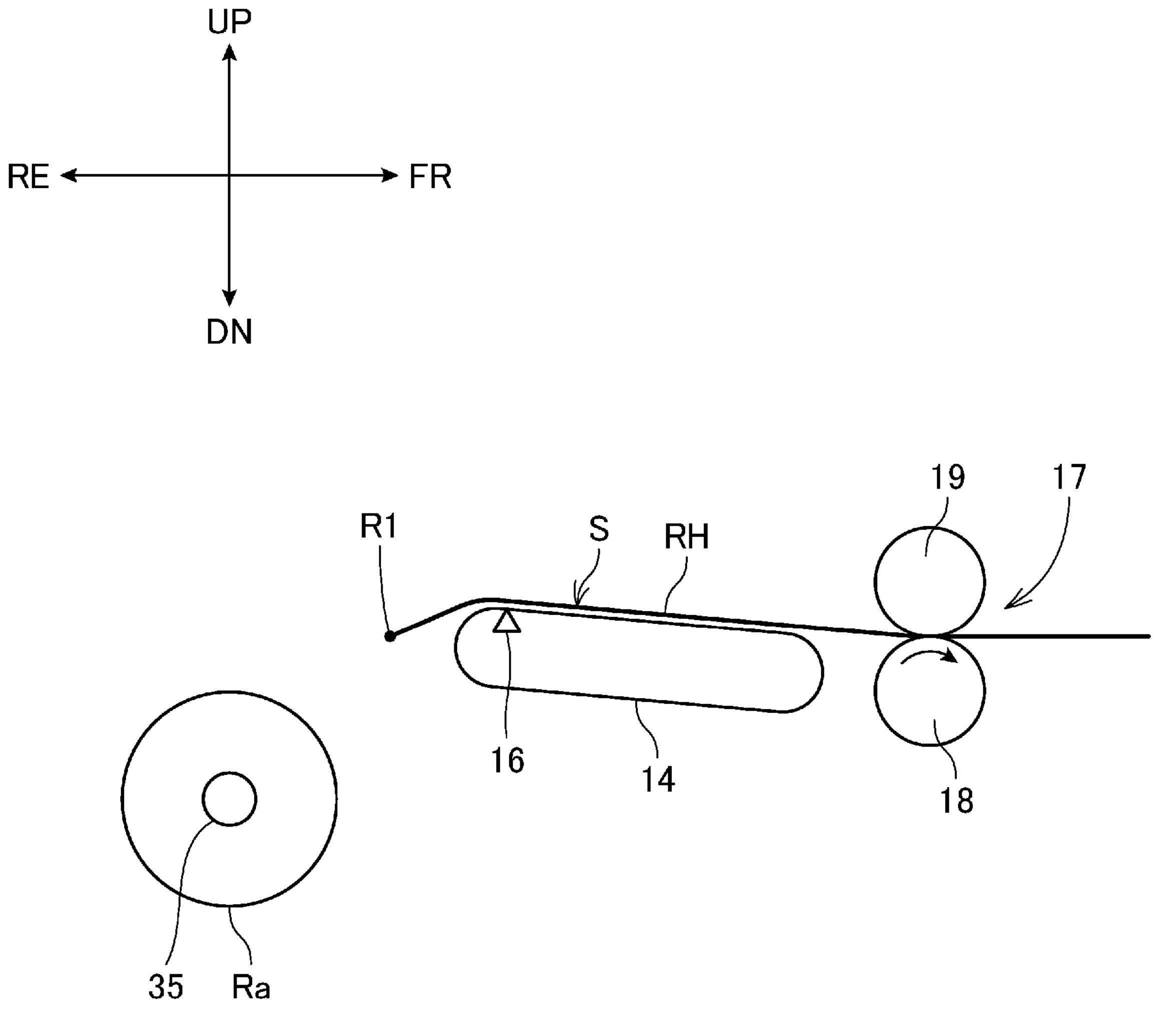
FIG. 9 is a view showing a state in which the roll paper is separated from the core body.
Figure 10:
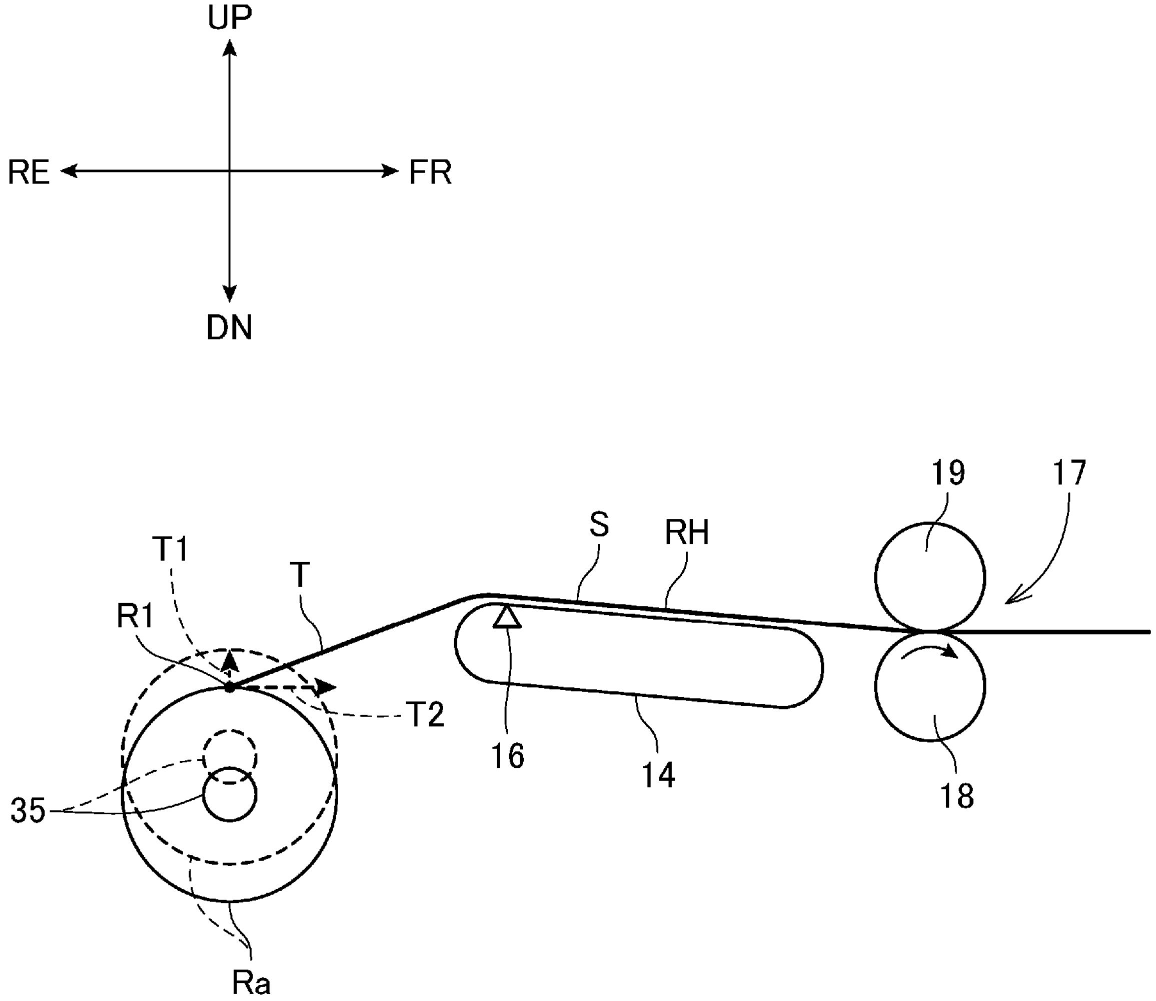
FIG. 10 is a diagram showing a state in which the roll paper is not separated from the core body.

FIG. 8 is a diagram showing a case in which the remaining amount of the roll paper R has become small, and shows a case in which tension T acts on the trailing edge R1 of the transport roll paper RH. FIG. 9 is a diagram illustrating a state in which the transport roll paper RH has separated from the core body Ra. FIG. 10 is a diagram illustrating a state in which the transport roll paper RH has not separated from the core body Ra.

At the feeding position P1 where the print medium S separates from the roll paper R, the transport mechanism 17 draws the transport roll paper RH from the roll paper R, so that tension T is generated in the transport roll paper RH in the direction in which the transport roll paper RH is drawn out.

Here, the roll paper R is configured by attaching the trailing edge R1 of the print medium S to the core body Ra and winding the print medium S around the core body Ra. Therefore, the roll paper R can be classified into the following two modes depending on whether or not the trailing edge R1 of the print medium S has separated from the core body Ra due to the action of the tension T.

A first mode is a mode in which, when the tension T by the transport mechanism 17 acts on the trailing edge R1 of the print medium S, the trailing edge R1 is peeled off from the core body Ra in accordance with the tension T and separates from the core body Ra. In the first mode, for example, the trailing edge R1 of the print medium S is attached to the core body Ra with the tape having a weak adhesive force.

A second mode is a mode in which, when the tension T by the transport mechanism 17 acts on the trailing edge R1 of the print medium S, the trailing edge R1 of the print medium S is maintained in a state of being attached to the core body Ra against the tension T and does not separate. In the second mode, for example, the trailing edge R1 of the print medium S is firmly attached to the core body Ra by an adhesive, tape having a high adhesive force, or the like. In other words, it means that the trailing edge R1 of the print medium S is fixed to the core body Ra.

In the case of the first mode, as shown in FIG. 9, when the printing medium S wound around the core body Ra runs out, the tension T acts on the trailing edge R1 of the printing medium S due to the action of the transport force by the transport mechanism 17, and the trailing edge R1 of the printing medium S separates from the core body Ra. Therefore, when the print medium S is transported downstream in the transport direction H by the transport mechanism 17, the trailing edge R1 of the print medium S passes through the detection position of the paper detection sensor 16. Therefore, in the case of the first mode, it is possible to detect that there is no paper in the roll paper R based on the detection value of the paper detection sensor 16. This makes it possible to stop the print operation.

On the other hand, in the case of the second mode, since the trailing edge R1 does not separate from the core body Ra during the print operation, the trailing edge R1 cannot pass by the paper detection sensor 16. That is, the print operation cannot be stopped based on the detection value of the paper detection sensor 16. However, in the case of the second mode, since the direction of the tension T is non orthogonal to the extension direction L1, the support shaft 35 receives drag from the engagement section front surface 55*b*, and also receives a force in a direction moving away from the positioning surface 52 and along the engagement section front surface 55*b* of the engagement groove 50.

That is, as shown in FIG. 10, the tension T is broken down into a component force T1 along the extension direction L1 of the engagement grooves 50, 59 and a component force T2 along a direction orthogonal to the extension direction L1 of the engagement grooves 50 and 59. In this case, the component force T1 in the extension direction L1 of the engagement grooves 50, 59 constitutes a force for separating the roll feeding shaft 12 from the positioning surface 52. In other words, the component force T1 in the extension direction L1 of the engagement grooves 50, 59 is larger than the self weight of the roll feeding shaft 12 by a predetermined amount. Therefore, when the trailing edge R1 of the print medium S is fixed to the core body Ra and all of the print medium S that is drawable out from the roll paper R is drawn out, the roll feeding shaft 12 is displaced in a direction moving away from the positioning surface 52 by the tension T applied to the print medium S by the transport mechanism 17.

Therefore, it is possible to detect that there is no paper in the roll paper R based on the detection value of the shaft separation detection sensor 60.

Therefore, in a case where the shaft separation detection sensor 60 detects that the roll feeding shaft 12 has separated from the positioning surface 52, the control section 100 determines that all of the print medium S that is drawable out from the roll paper R has been drawn out by the transport mechanism 17, that is, a no paper state has occurred.

In a case where the shaft separation detection sensor 60 determines that paper has run out, the control section 100 stops the printing operation even during execution of printing. That is, the control section 100 performs control to stop the transport by the transport section 220. In addition, the control section 100 moves the inkjet head 22 to a home position and stops printing, after performing control to end printing by the printing section 230. Further, the control section 100 stops the feed motor 43 of the roll rotation section 210.

For this reason, the transport mechanism 17 is restrained from attempting to transport the transport roll paper RH while the print medium S and the core body Ra, that is, the transport roll paper RH and the core body Ra, are pulled taught. Therefore, damage to the drive roller 18 and the driven roller 19 can be suppressed. In addition, wasteful ejection of the ink from the inkjet head 22 is suppressed.

Then, the control section 100 reports that there is no paper. In the present embodiment, the control section 100 turns on the LED indicator 162, for example.

In addition, even when the shaft separation detection sensor 60 does not detect that the roll feeding shaft 12 has separated from the positioning surface 52, the control section 100 also determines that a no paper state has occurred when the paper detection sensor 16 detects that there is no print medium S.

Here, a transport distance along the transport path 13 from the paper detection sensor 16 to the transport mechanism 17 is known. Therefore, when the paper detection sensor 16 detects the no paper state, printing can be performed until just before the trailing edge R1 passes through the transport mechanism 17.

Therefore, when the control section 100 determines that there is no paper using the paper detection sensor 16, the control section 100 executes a trailing edge print operation in which printing is continued until just before the trailing edge R1 passes through the transport mechanism 17. That is, the control section 100 causes the trailing edge R1 to be transported by a predetermined distance and to be transported immediately before passing through the transport mechanism 17, and when the pass printing in the vicinity of the trailing edge R1 is completed, stops printing.

Accordingly, it is possible to effectively use the roll paper R to the end, and it is easy to reduce loss of the roll paper R. In addition, it is possible to avoid dragging the tape or the like, which fixes the trailing edge R1 and the core body Ra, to the position of the inkjet head 22.

The control section 100 reports that there is no paper. In the present embodiment, for example, the LED indicator is turned on.

8. Operation of Printing Apparatus

Figure 11:
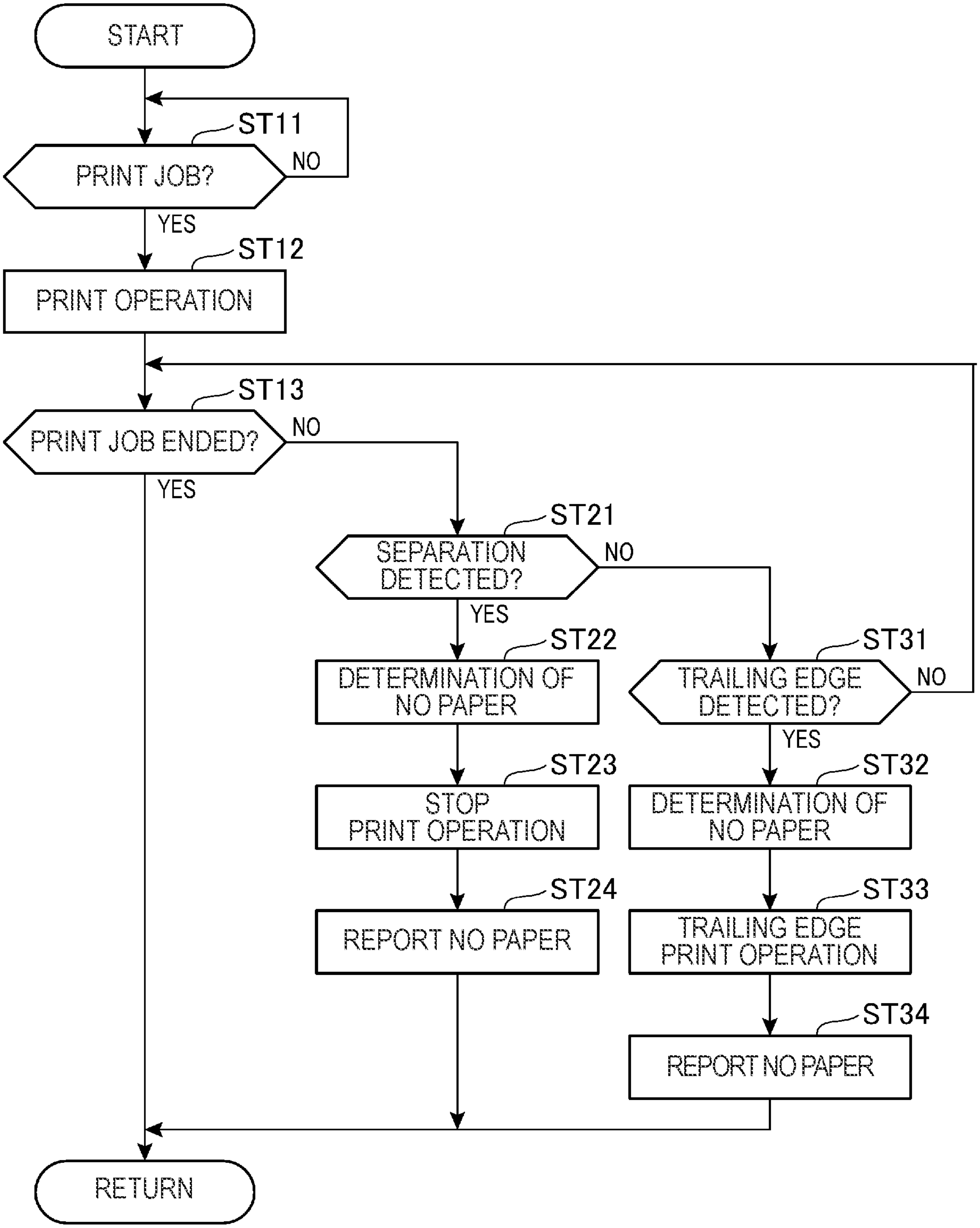
FIG. 11 is a flowchart showing operation of the printing apparatus.

FIG. 11 is a flowchart showing the operation of the printing apparatus 10.

The control section 100 starts when the power is turned on, and determines whether there is a print job (step ST11).

When it is determined that there is no print job (step ST11: NO), the control section 100 repeats the process of step ST11 until a print job is input.

When the control section 100 determines that there is a print job (step ST11: YES), the control section 100 starts a print operation (step ST12).

The control section 100 determines whether or not the print job has ended (step ST13).

In a case where it is determined that the print job has ended (step ST13: YES), the control section 100 returns to the process of step ST11.

In a case where it is determined that the print job has not ended (step ST13: NO), the control section 100 determines whether or not the roll feeding shaft 12 has separated (step ST21).

When the control section 100 determines that the roll feeding shaft 12 has separated from the positioning surface 52 (step ST21: YES), the control section 100 determines that there is no paper (step ST22).

The control section 100 stops the printing operation (step ST23).

The control section 100 reports the no paper state (step ST24).

The control section 100 returns to the process of step ST11 after reporting the no paper state.

When the control section 100 determines that the roll feeding shaft 12 has not separated from the positioning surface 52 (step ST21: NO), the control section 100 determines whether or not the trailing edge R1 of the print medium S was detected (step ST31).

When the control section 100 determines that the trailing edge R1 of the print medium S was not detected (step ST31: NO), the control section 100 returns to the process of step ST13.

When the control section 100 determines that the trailing edge R1 of the print medium S was detected (step ST31: YES), the control section 100 determines that there is no paper (step ST32).

The control section 100 executes the trailing edge print operation (step ST33).

The control section 100 reports the no paper state (step ST34).

The control section 100 returns to the process of step ST11 after reporting the no paper state.

In the present embodiment, when the trailing edge R1 of the print medium S is fixed to the core body Ra and all of the print medium S that is drawable out from the roll paper R is drawn out, the roll feeding shaft 12 is displaced in the direction away from the positioning surface 52 by the tension T applied to the print medium S by the transport mechanism 17. Therefore, by using the shaft separation detection sensor 60, it is possible to detect that there is no paper. When the shaft separation detection sensor 60 detects that there is no paper, the print operation is stopped.

Here, when the roll feeding shaft 12 separates from the positioning surface 52, the driven gear 41 is unmeshed from the drive gear 47. Therefore, even when the drive gear 47 rotates, the driving force is not transmitted to the roll feeding shaft 12, and transmission of the driving force to the roll feeding shaft 12 can be easily interrupted.

When the roll feeding shaft 12 detaches, the transport mechanism 17 and the feed drive mechanism 42 are stopped, and the no paper state is reported. Therefore, the user can take the roll feeding shaft 12 out from the accommodation section 11 and set a new roll paper R on the roll feeding shaft 12. The roll feeding shaft 12 in which the new roll paper R is set is engaged with the engagement grooves 50, 59, and the support shaft 35 is engaged so as to come into contact with the positioning surface 52. Thus, the driven gear 41 and the drive gear 47 are meshed with each other.

This makes it possible to resume printing.

Here, the tension T applied to the trailing edge R1 of the print medium S is tension from the rear end 72*a* of the guide member 14. Therefore, by the guide member 14, the direction of the tension T applied to the roll feeding shaft 12 can be in a direction that makes detection easy. For example, by arranging the rear end 72*a* of the guide member 14 above the engagement grooves 50, 59 and setting the tension T along the extension direction L1 of the engagement grooves 50, 59, the roll feeding shaft 12 can be easily separated from the positioning surface 52 by the tension T.

9. Action of Embodiment

As described above, the printing apparatus 10 according to the embodiment includes the roll feeding shaft 12 that supports the core body Ra of the roll paper R formed by winding the print medium S around the core body Ra in a roll shape, and the transport mechanism 17 that transports the elongated print medium S drawn out from the roll paper R along the transport path 13. In addition, the printing apparatus 10 according to the present embodiment includes the left accommodation sidewall 27 and the right accommodation sidewall 28 that configure a portion of the accommodation section 11 that accommodates the roll paper R and that are disposed to face each other in the width direction, which intersects the transport direction H of the print medium S. Furthermore, the printing apparatus 10 of the present embodiment includes the inkjet head 22 that prints an image on the print medium S, and the shaft separation detection sensor 60 that detects that all of the print medium S that is drawable out from the roll paper R has been drawn out by the transport mechanism 17. The left accommodation sidewall 27 and the right accommodation sidewall 28 have the engagement grooves 50, 59, respectively. The roll paper R is accommodated in the accommodation section 11 by engaging the roll feeding shaft 12 with the engagement grooves 50, 59, and the shaft separation detection sensor 60 detects that the roll feeding shaft 12 has separated from the positioning surface 52 of the groove.

Therefore, in a case where the print medium S wound around the core body Ra is completely drawn out from the core body Ra, when the trailing edge R1 of the print medium S is fixed to the core body Ra, the roll feeding shaft 12 is separated from the positioning surface 52 by the print medium S drawn out by the transport mechanism 17. Therefore, by detecting whether or not the roll feeding shaft 12 is separated from the positioning surface 52, in a case where the trailing edge R1 of the print medium S is fixed, it is possible to detect that the print medium S that is drawable out from the roll paper R has all been drawn out from the core body Ra by the transport mechanism 17.

In the present embodiment, the control section 100 is provided that determines that all of the print medium S that is drawable out from the roll paper R has been drawn out by the transport mechanism 17, when the shaft separation detection sensor 60 detects that the roll feeding shaft 12 is separated from the positioning surface 52.

Therefore, the control section 100 can accurately determine whether or not all of the print medium S has been drawn out.

In addition, in the embodiment, the trailing edge R1 of the print medium S is fixed to the core body Ra, and when all of the print medium S that is drawable out from the roll paper R is drawn out, the tension T that is applied to the print medium S by the transport mechanism 17 is exerted. The roll feeding shaft 12 is displaced in the direction away from the positioning surface 52 by the tension T.

Therefore, the roll feeding shaft 12 can be separated from the positioning surface 52 by tension.

In addition, in the present embodiment, the shaft separation detection sensor 60 includes the lever 61 that comes into contact with the roll feeding shaft 12 in a state in which the roll feeding shaft 12 is engaged with the positioning surface 52, and the biasing member 62 that biases the lever 61 toward the roll feeding shaft 12. The shaft separation detection sensor 60 has a configuration in which the lever 61 is displaced by the biasing force of the biasing member 62 when the roll feeding shaft 12 separates from the positioning surface 52.

Therefore, the shaft separation detection sensor 60 can be configured by a mechanical detection section, and can have a simple configuration.

In the present embodiment, the paper detection sensor 16 that detects the presence or absence of the print medium S is provided in the transport path 13. When the shaft separation detection sensor 60 does not detect that the roll feeding shaft 12 separated from the positioning surface 52, the control section 100 causes the paper detection sensor 16 to detect the presence or absence of the print medium S. In this case, when the paper detection sensor 16 detects that there is no print medium S, the control section 100 also determines that all of the print medium S that is drawable out from the roll paper R has been drawn out by the transport mechanism 17.

Therefore, also when the trailing edge R1 of the print medium S has peeled off from the core body Ra, it can be determined that all of the print medium S that is drawable out from the roll paper R has been drawn out by the transport mechanism 17.

In the present embodiment, the drive gear 47 for rotating the roll feeding shaft 12 and the driven gear 41 meshed with the drive gear 47 are disposed in the accommodation section 11. The roll feeding shaft 12 has the roll shaft section 31 inserted into the hollow core body Ra, and the driven gear 41 is provided on the roll shaft section 31. In the printing apparatus 10, the driven gear 41 and the drive gear 47 are meshed with each other by engaging the roll shaft section 31 into the engagement grooves 50, 59, and the meshed state of the driven gear 41 and the drive gear 47 is unmeshed by separating the roll shaft section 31 from the positioning surface 52.

Therefore, when the roll feeding shaft 12 is separated from the positioning surface 52, unnecessary feeding can be suppressed.

In the present embodiment, the roll shaft section 31 includes the insertion member 32 that extends in the width direction and is inserted into the core body Ra. The roll shaft section 31 includes the left flange member 33 fixed to the insertion member 32 and configured to support the roll paper R from the first end in the width direction. Further, the roll shaft section 31 has the insertion hole 34*a* into which the insertion member 32 is detachably inserted, and is provided with the right flange member 34 configured to support the roll paper R from the second end in the width direction. The driven gear 41 constitutes a part of the left flange member 33.

Therefore, the roll feeding shaft 12 can be driven in a state in which the roll paper R is positioned in the width direction.

In the present embodiment, the transport mechanism 17 includes the drive roller 18, and the guide member 14 that guides the print medium S is provided between the roll feeding shaft 12 and the drive roller 18 in the transport path 13.

Therefore, by the guide member 14, the direction of the tension T applied to the roll feeding shaft 12 can be made to be a direction that facilitates detection.

In addition, as described above, in the control method of the printing apparatus according to the embodiment, the printing apparatus 10 detects that the print medium S that is drawable out from the roll paper R is all drawn out by the transport mechanism 17 based on the separation of the roll feeding shaft 12 from the positioning surface 52. Here, the printing apparatus 10 includes the roll feeding shaft 12 that supports the core body Ra of the roll paper R formed by winding the print medium S around the core body Ra in a roll shape, and the transport mechanism 17 that transports the elongated print medium S pulled out from the roll paper R along the transport path 13. The addition, the printing apparatus 10 includes the left accommodation sidewall 27 and the right accommodation sidewall 28 that configure a portion of the accommodation section 11 for accommodating the roll paper R and that are disposed to face each other in the width direction, which intersects the transport direction H of the print medium S. Further, the printing apparatus 10 includes the inkjet head 22 that prints an image on the print medium S. In the printing apparatus 10, the left accommodation sidewall 27 and the right accommodation sidewall 28 have the engagement grooves 50, 59, respectively, and the roll paper R is accommodated in the accommodation section 11 by the roll feeding shaft 12 engaging with the engagement grooves 50 and 59.

Therefore, in a case where the print medium S wound around the core body Ra is completely drawn out from the core body Ra, when the trailing edge R1 of the print medium S is fixed to the core body Ra, the roll feeding shaft 12 is separated from the positioning surface 52 by the print medium S drawn out by the transport mechanism 17. Therefore, by detecting whether or not the roll feeding shaft 12 is separated from the positioning surface 52, in a case where the trailing edge R1 of the print medium S is fixed, it is possible to detect that the print medium S that is drawable out from the roll paper R has all been drawn out from the core body Ra by the transport mechanism 17.

10. Other Embodiments

The above described embodiments are merely specific modes for carrying out the present disclosure described in the claims and do not limit the present disclosure, and the present disclosure can be carried out in various modes as shown below, for example, without departing from the gist of the present disclosure.

For example, in the above described embodiment, a case where the printing apparatus is an ink jet printer was described as an example. However, an object to which the present disclosure is applied is not limited to an ink jet printer. That is, the present disclosure can be widely applied to an apparatus configured to accommodate a roll in which a sheet whose end is attached to the core body Ra is wound.

In the above described embodiment, a configuration was described wherein the shaft separation detection sensor 60, which corresponds to an example of the trailing edge detection section, includes the lever 61. However, the trailing edge detection section may be, for example, an optical sensor or an ultrasonic sensor, and the configuration of the detection unit is not limited as long as it can detect whether or not the support shaft 35 is separated from the positioning surface 52.

In order to facilitate understanding of the present disclosure, the functional blocks described with reference to the drawings are schematic diagrams in which the functional configuration of each device is classified according to the main processing content. The configuration of each device can be classified into more constituent elements according to the processing content. In addition, one component may be classified so as to perform more processes. In addition, the processing of each component may be executed by one piece of hardware or may be executed by a plurality of pieces of hardware. Further, the processing of each component may be realized by one program or may be realized by a plurality of programs.

The processing units of the flowcharts shown in the figures are divided according to the main processing contents in order to facilitate understanding of the processing of each device. The present disclosure is not limited by the way of dividing the processing units or by the names thereof. The processing of each device can be divided into more processing units according to the processing content. Further, one processing unit can be divided so as to include more processes. In addition, as long as similar processing can be performed, the processing order of the above described flowcharts is not limited to the illustrated example.

What is claimed is:

1. A printing apparatus, comprising:

a support member configured to support a core body of a roll medium formed by winding a print medium around the core body in a roll shape;

a transport mechanism configured to transport the elongated print medium drawn out from the roll medium along a transport path;

a first accommodation sidewall and a second accommodation sidewall that constitute a part of an accommodation section configured to accommodate the roll medium, the first accommodation sidewall and the second accommodation sidewall being disposed to face each other in a width direction that intersects a transport direction of the print medium, the first accommodation side having a groove, the roll medium being accommodated in the accommodation section by the support member engaged with the groove;

a print head configured to print an image on the print medium;

a trailing edge detection section configured to detect that all of the print medium that is drawable out from the roll medium has been drawn out by the transport mechanism by detecting that the support member separated from the engagement surface of the groove, the trailing edge detection section comprising a lever that, in a state in which the support member is engaged with the engagement surface, contacts the support member and a biasing member that biases the lever toward the support member, wherein only when the support member separates from the engagement surface, the lever is displaced by the biasing force of the biasing member; and a medium detection section configured to detect presence or absence of the print medium in the transport path, wherein even when the trailing edge detection section does not detect that the support member separated from the engagement surface, the control section determines that all of the print medium that is drawable out from the roll medium has been drawn out by the transport mechanism when the medium detection section detects that there is no print medium.

2. The printing apparatus according to claim 1, further comprising:

a control section configured to determine, when the trailing edge detection section detects that the support member is separated from the engagement surface, that all of the print medium that is drawable out from the roll medium has been drawn out by the transport mechanism.

3. The printing apparatus according to claim 2, wherein:

a trailing edge of the print medium is fixed to the core body and, when all of the print medium that is drawable out from the roll medium has been drawn out, the support member is displaced in a direction away from the engagement surface by the tension applied to the print medium by the transport mechanism.

4. The printing apparatus according to claim 1, wherein:

the accommodation section includes a drive gear for rotating the support member and a driven gear meshing with the drive gear;

the support member includes a shaft member inserted into a hollow of the core body, and the driven gear is provided on the shaft member;

the driven gear and the drive gear are meshed with each other by engaging the shaft member with the groove; and when the shaft member separates from the engagement surface, the meshed state between the driven gear and the drive gear is released.

5. The printing apparatus according to claim 4, wherein:

the shaft member includes an insertion member extending in the width direction and inserted into the core body, a first width support member that is fixed to the insertion member and that is configured to support the roll medium from a first end in the width direction, and a second width support member that has an insertion hole through which the insertion member is detachably inserted and that is configured to support the roll medium from a second end in the width direction and the driven gear constitutes a part of the first width support member.

6. The printing apparatus according to claim 1, wherein:

the transport mechanism has a drive roller and a guide member configured to guide the print medium is provided between the support member and the drive roller in the transport path.

7. The printing apparatus according to claim 1, wherein the biasing force of the biasing member is weaker than a force needed to separate the support shaft of the roll feeding shaft from the engagement surface.

8. A control method of a printing apparatus, the printing apparatus including:

a support member configured to support a core body of a roll medium formed by winding a print medium around the core body in a roll shape;

a transport mechanism configured to transport the elongated print medium drawn out from the roll medium along a transport path;

a first accommodation sidewall and a second accommodation sidewall that constitute a part of an accommodation section that accommodates the roll medium, the first accommodation sidewall and the second accommodation sidewall being disposed to face each other in a width direction that intersects a transport direction of the print medium, the first accommodation side having a groove, the roll medium being accommodated in the accommodation section by the support member engaged with the groove; and a print head configured to print an image on the print medium, the method comprising:

detecting that the print medium that is drawable from the roll medium is completely drawn out by the transport mechanism, based on separation of the support member from the engagement surface of the groove, the detection being performed based on displacement of a lever that, in a state in which the support member is engaged with the engagement surface, contacts the support member and a biasing member that biases the lever toward the support member, wherein only when the support member separates from the engagement surface, the lever is displaced by the biasing force of the biasing member; and detecting presence or absence of the print medium in the transport path, wherein even when the trailing edge detection section does not detect that the support member separated from the engagement surface, the control section determines that all of the print medium that is drawable out from the roll medium has been drawn out by the transport mechanism when the medium detection section detects that there is no print medium.

* * * * *